United States Patent [19]

Bundy et al.

[11] Patent Number: 4,943,324

[45] Date of Patent: Jul. 24, 1990

[54] HIGH PERFORMANCE PAPER FILLER AND METHOD OF PRODUCING SAME

[75] Inventors: Wayne M. Bundy, Lebanon; John A. Manasso, Belle Mead; Joseph P. Berberich, Barnegat, all of N.J.

[73] Assignee: Georgia Kaolin Company, Inc., Union, N.J.

[21] Appl. No.: 197,357

[22] Filed: May 23, 1988

[51] Int. Cl.$^5$ .............................. C09C 1/28; C09C 3/06
[52] U.S. Cl. .................................... 106/486; 106/416; 501/145; 501/146
[58] Field of Search ....................... 106/416, 415, 486; 501/145, 146, 149

[56] References Cited

U.S. PATENT DOCUMENTS

| | | | |
|---|---|---|---|
| 3,085,894 | 4/1963 | Rowland | 106/306 |
| 3,151,993 | 10/1964 | Bundy | 106/20 |
| 3,403,041 | 9/1968 | Lyons et al. | 106/288 |
| 3,615,806 | 10/1971 | Torock et al. | |
| 3,620,789 | 11/1971 | Solomon | 106/288 B |
| 4,076,548 | 2/1978 | Bundy et al. | 106/288 B |
| 4,078,941 | 3/1978 | Bundy et al. | |
| 4,241,142 | 12/1980 | Kaliski et al. | |

OTHER PUBLICATIONS

Clays and Clay Minerals, vol. 21, pp. 295–302, "The Effect of Aluminum on the Surface Properties of Kaolinite", Bundy et al., 1973.

*Primary Examiner*—Paul Lieberman
*Assistant Examiner*—Christine A. Skane
*Attorney, Agent, or Firm*—William W. Habelt

[57] ABSTRACT

A high bulking kaolin pigment is provided which exhibits improved opacifying efficiency as a paper filler. The kaolin pigment comprises an uncalcined clay composition consisting essentially of kaolin particles which have not only been treated with an amine, but also upon which aluminum hydroxide has been precipitated, and, of which less than about 20% by weight have a particle size less than 0.3 microns in equivalent spherical diameter. Further, a method is provided for producing the pigment from a hydrated kaolin clay having a brightness of at least about 89. The selected starting clay is dispersed in water and subjected as a slurry to delamination, defining, surface treatment with an amine and aluminum sulfate, and leaching. The treated kaolin slurry is subsequently rinsed and filtered to a produce a filter cake which is redispersed to yield a commercial paper filler.

20 Claims, No Drawings

HIGH PERFORMANCE PAPER FILLER AND METHOD OF PRODUCING SAME

BACKGROUND OF THE INVENTION

The present invention relates to a kaolin composition exhibiting high bulking properties and to a method of producing the kaolin composition by beneficiating a kaolin clay. More specifically, the present invention relates to a beneficiated kaolin product having improved opacifying efficiency thereby rendering the product functional as a high performance paper filler, and to a method of producing the beneficiated kaolin product from a base kaolin composition having a brightness in the range of 89 to 91 and a particle size distribution of 88 to 92 percent by weight of particles less than 2 microns in equivalent spherical diameter.

It is well known in the paper industry, that a wide variety of fillers and pigments, such as titanium dioxide, calcium carbonate, silica, alumina and kaolin, are suitable for use as paper fillers. Kaolin, a hydrated aluminum silicate, is presently the most widely utilized and is available in a range of particle sizes and brightnesses, as well as being either delaminated or non-delaminated. Hydrated kaolin is white in color, has a fine particle size, and is relatively chemically inert, in addition to its low cost makes it an ideal paper filler. Although, calcined (anhydrous) kaolin is also available for use as a paper filler and can impart greater opacity to paper than the hydrated kaolin, it has the serious disadvantage of being more abrasive.

Prior art kaolin paper fillers are typically produced by a beneficiation process which typically consists of fractionating in a continuous centrifuge to control particle size followed by leaching to remove iron-based colored compounds. In the leaching process the kaolin is acidified with $H_2SO_4$ to a pH of 3.0 to solubilize the iron. Sodium hydrosulfite is then added to reduce the iron to a more soluble ferrous form which is removed during the dewatering process. The flocculated clay, generally at approximately 30% solids by weight, is then filtered, such as by dewatering on a rotary vacuum filter to a solids level approximately 60% by weight. The filter cake is then either dried or redispersed with additional dry clay if it is to be sold as approximately 70% by weight solids slurry. To produce high brightness products, i.e., fillers having a brightness index greater than 90, impurities may be removed from the kaolin clay by further processing the kaolin clay through flotation or magnetic separation. To produce a delaminated product, the coarse fraction from the initial centrifugation is ground in sand grinders to shear the stacks of platelets normally found in kaolin and thereby produce individual particles having an equivalent spherical diameter less than 2 microns.

The anhydrous kaolin products generally available as paper fillers are typically produced by calcining hydrated kaolin at temperatures up to 1050° C. so that structural hydroxyl groups are driven out as water vapor. The resulting material has an amorphous structure which contains voids which produce interfaces between kaolin and air. These interfaces of kaolin and air, which are not found in hydrated kaolin, serve as sites for light scattering. From the Fresnel Equation:

$$\text{Reflection Coefficient } (R) = \frac{(Na - Nb)^2}{(Na + Nb)^2}$$

where
Na = refractive index of component a
Nb = refractive index of component b
it is seen that the greater the difference in the refractive index of the various constituents of a system, the greater the reflection. Thus, the incorporation of air (N=1) into a paper fiber (N=1.5) and kaolin (N=1.56) matrix enhances light scattering. Because of this phenomena, calcined kaolin clay has greater optical efficiency than other kaolin products when utilized as a filler for paper.

For example, a paper handsheet formed from a paper pulp incorporating a commercially available calcined (anhydrous) kaolin filler at a level of 10 percent by weight exhibited an opacity of 80.9, a brightness of 87.0, and a scattering coefficient of 2030 sq. centimeters/gram. For comparison, a paper handsheet formed from a paper pulp incorporating a commercially available delaminated hydrated kaolin filler at a level of 10 percent by weight exhibited an opacity of 76.4, a brightness of 84.8, and a scattering coefficienct of 1180 sq. centimeters/gram. The greater brightness of the paper handsheet incorporating the calcined kaolin filler is largely attributable to the greater brightness of calcined kaolin, typically about 93, vis-a-vis the less brightness of hydrated kaolin, typically about 90.

Other opacifying pigments are commercially available to the papermaker. Because of its high refractive index, 2.55 for anatase and 2.7 for rutile, titanium dioxide is presently the opacifier of primary commercial importance. When incorporated into paper, titanium dioxide also imparts exceptional brightness and whiteness to the sheet. However, the main disadvantage of titania is its cost. Commercial grade titania is approximately 4 times more costly than commercial grade anhydrous kaolin and up to 25 times higher than the commercial grade hydrated kaolin. Due to this cost factor, other products have been developed and are in commercial use of titania "extender" pigments. These products, which can be used to replace portions of the titanium dioxide without a loss of opacity of the paper, include calcined clay, delaminated hydrated clays, fine-particle size silica and alumina, and sodium aluminumsilicate. The effectiveness of either calcined or delaminated kaolin clay as extenders for titanium dioxide can, in part, be attributed to the paucity of colloidal fines, i.e., particles having a fineness of less than about 0.3 microns equivalent spherical diameter. Calcined kaolin can be produced having a content of only 5 to 10% by weight of colloidal particles, and standard filler clay can be produced having a content as high as about 40% by weight of colloidal particles.

The influence of defining upon the optical performance of kaolin pigments has been previously observed. "Defining" refers to the operation of separating and discarding a percentage of the fine fraction of the kaolin suspension. U.S. Pat. No. 3,085,894 discloses the selective fractionation of natural occurring kaolin by sedimentation and centrifugation into several size ranges to produce a coating pigment of improved opacity, brightness and gloss. As discussed therein, the optimum optical performance was obtained with a kaolin product having a particle size distribution in the range of 70% to 84% of the particles less than one micron in equivalent spherical diameter.

It has also been shown that surface treatment of kaolin particles can improve the optical performance of kaolin pigments. For example, in U.S. Pat. No. 4,076,548 a high bulking clay was produced by selective flocculation of ultra-fine particles of kaolinite with the addition of either an organic flocculant, or a polyamine and citric acid, or ethylenediamine and citric acid. As a result of such treatment, voids are incorporated into the pigment which result in better opacity and improved brightness and reflectance in paper coating. Although this product has been commercialized by Georgia Kaolin Company, Inc. of Union, N. J., under the trade name of Astra-Lite, it has not been found suitable as a paper filler because the aggregate structure breaks down under the shear conditions inherent in the wet-end of a paper machine. Subsequent losses in scattering efficiency occur as a result of shear. In U.S. Pat. No. 4,640,716, it is disclosed that the addition of the zirconium ion to an uncalcined clay results in a high bulking pigment having a higher scattering coefficient than an untreated base. When incorporated into a fiber matrix, however the product did not result in improved opacity over the product incorporating its unmodified counterpart.

Accordingly, it is an object of the present invention to provide a hydrated kaolin product which exhibits improved opacifying characteristics as a paper filler thereby being suitable as a substitute or extender for commercially available calcined kaolin and titania paper fillers.

It is a further object of the present invention to provide a method of producing a hydrated kaolin product exhibiting improved performance as a paper filler.

SUMMARY OF THE INVENTION

In accordance with the present invention, a high bulking kaolin pigment is provided which exhibits improved opacifying efficiency when used as a filler material, either alone or as an extender for titanium dioxide and/or calcined clay, in paper sheets and similar paper products. The kaolin pigment of the present invention comprises a uncalcined kaolin clay composition consisting essentially of kaolin particles which have not only been treated with an amine, but also upon which aluminum hydroxide has been precipitated, and have a collidal particle size content, i.e., particles less than 0.3 microns in equivalent spherical diameter, of less than about 20% by weight, and preferably about 10% by weight.

Further in accordance with the present invention, a method is provided for producing the high bulking uncalcined kaolin pigment of the present invention from a hydrated kaolin clay having a brightness of at least about 89. The selected base kaolin preferably has a particle size distribution of about 88% to about 92% by weight of the kaolin clay particles less than 2 microns in equivalent spherical diameter, although kaolins having a particle size distribution outside of this range may also be successfully treated in accordance with the present invention. The selected base kaolin clay is dispersed in a solution of a water soluble dispersing agent to form an aqueous clay slurry. The aqueous clay slurry is then subjected to delamination, preferably by wet media grinding, and partial defining to remove a substantial portion of the colloidal fines therefrom. Although it is preferred that the delamination step be carried out prior to the defining step, the order may be reversed while still producing an acceptable product albeit not as superior as the product produced when the delamination step precedes the defining step.

After defining and delamination, the kaolin clay particles are surface treated by admixing into the aqueous clay slurry a member from the group consisting of a water soluble amine, such as hexamethylenediamine, aluminum sulfate, and mixtures thereof while agitating the aqueous clay slurry. The preferred surface treatment comprises first mixing into the aqueous clay slurry hexamethylenediamine in aqueous solution at a level of 0.05% to 0.2% by weight of dry clay and thence mixing into the clay/amine slurry, aluminum sulfate in aqueous solution at a treatment level of 0.3% to 1.0% by weight of dry clay, and continuously stirring the admixture to insure an even deposition of aluminum hydroxide onto the kaolin clay plates formed during delamination.

After surface treatment, the pH of the aqueous clay slurry to adjusted to about 3.0 prior to bleaching the kaolin clay particles to improve brightness by treating the aqueous clay slurry with a water soluble leaching agent. After leaching, the pH of the aqueous clay slurry is adjusted to about 5.0 to cause the precipitation of aluminum hydroxide unto the surface of the clay plates. The delaminated, defined and treated kaolin clay particles are then filtered, while rinsing with water to remove soluble by-products, to produce the product filter cake of the present invention. Preferably, the product filter cake is redispersed in an aqueous solution of a water soluble dispersing agent at a pH of about 8.0 for commercial use as a paper filler either alone, or as an extender for titanium dioxide or calcined clay, in making paper sheets and similar paper products.

DESCRIPTION OF A PREFERRED EMBODIMENT

The high performance as a paper filler of the high bulking kaolin clay product of the present invention will perhaps be most appreciated, and the process of the present invention for producing the subject high bulking kaolin clay product will perhaps be most clearly understood with reference to the examples hereinafter which are to be regard as illustrative, not limiting, of the present invention.

In the examples to be presented, all performance data were obtained in handsheet tests. The basic procedure consists of incorporating the pigments and fillers into a furnish consisting of 50% Hardwood Kraft and 50% Softwood Pine. The subject pulp blend was beaten to a Canadian Standard Freeness of 450 ml at 2% consistently and then diluted with deionized water to 0.5% consistency. Aliquots of the pulp blend were taken to produce three sheets for each pigment level (40 lb/3300 ft$^2$). To these aliquots the required amount of fillers and pigments was added to produce sheets having concentrations of 4% to 20%. After the addition of filler, 1% alum was added based upon total weight of pulp. Upon blending, aliquots were taken for one sheet. The pulp-filler blend was subjected to a shear rate of 1500 rpm utilizing a Britt Jar. After completion of the shear step, the rotation rate was lowered to 500 rpm and 0.025% by weight of Betz 1260, a high molecular weight polyacrylamide, was added for retention purposes. The sheets were then formed on 8"×8" Williams Sheet Molds, pressed and dried. They were tested for opacity, brightness, basis weight and total filler content by ashing, using TAPPI standard test methods.

From the resulting data, opacity was corrected to a 40 lb/ream loading utilizing the Kubelka Munk Theory. Regression analysis was utilized to determine the relationship between filler content and both opacity and brightness of paper. Using the regression equations, opacity and brightness of various filler and pigment systems are compared at equal loading. In the data reported, all results have been adjusted to a 10% filler content in the handsheets.

In each example, the starting kaolin clay composition, hereinafter termed the base kaolin clay composition, is a commercially available kaolin clay composition marketed as a paper coating material by the aforementioned Georgia Kaolin Company, Inc. as ASTRA-BRITE coating clay. This clay composition is characterized by its high brightness, which ranges from 89 to 91, and its particle size distribution of 92% by weight less than two microns. It is to be understood, however, that other kaolin clay compositions are suitable as a starting material in practicing the present invention and that the application of the present invention is not limited to kaolin of any particular particle size distribution.

Additionally, the base kaolin clay composition used in each example was blunged in water with sodium hexametaphosphate as a dispersing agent to form an aqueous slurry. Prior to defining, the optimum dispersant level, i.e., the amount of dispersant required to achieve the point of minimum viscosity for the resultant slurry, using sodium hexametaphosphate as the dispersant was determined. An excess of 0.05% sodium hexametaphosphate over the optimum level was added to the slurry to ensure good dispersion in the subsequent defining operation. It is to be understood, however, that other dispersing agents, such as but not limited to soda ash, sodium polyacrylate, and other dispersants equivalent to sodium hexametaphosphate may be used in practicing the present invention.

Delamination as used herein refers to the operation of subjecting the naturally occurring kaolin stacks in the aqueous clay slurry to shearing force thereby reducing the kaolin stacks to thin platelets. In the examples presented herein, delamination was carried out by subjecting an aqueous slurry of stacked kaolin particles to shearing action in a sandgrinder. It is to be understood, however, that the delamination may be carried out in other devices such as, but not limited to, ball or pebble mills, extruders or rotor-stator colloid mills, without departing from the spirit and scope of the present invention. Reference may be made to commonly assigned U.S. Pat. No. 3,615,806 of Andrew Torock and Thomas F. Walsh, the disclosure of which is hereby incorporated by reference, for a thorough discussion of the process of delamination of kaolin clay.

The term "defining" as used herein refers to the operation of separating and discarding a percentage of the fine fraction of the kaolin suspension. In each example presented herein, the defining operation was carried out on a centrifuge. The kaolin suspension to be "defined" was supplied to the centrifuge and processed therein to separate the suspension into a coarse fraction and a fine fraction. A selected percentage by volume of the fine fraction is discarded, while the remainder of the fine fraction is admixed with the coarse fraction for further processing. In each example, the percent defining level expressed refers to the volume percentage of the fine fraction which is discarded. For example, defining to a level of 40% means that 40% of the fine fraction from the centrifuge was discarded and that the remaining 60% of the fine fraction from the centrifuge was admixed with the coarse fraction from the centrifuge for further processing.

The fractionation operations referred to herein were also carried out by subjecting the suspension to centrifugation. However, in a fractionation operation, the entire fines fraction from centrifugation was discarded and only the coarse fraction saved. The level of fractionation and degree of delamination are expressed in terms of a volume percentage of centrifuged particle sedimentation or settling, CPS, after a given period of time. For example, fractionation to 0.10 CPS at 10 minutes means that 10% by volume of the centrifuged suspension was deposited as sediment during centrifugation.

As is well appreciated in the art, leaching of the kaolin to remove acidic soluble brightness degrading impurities should be carried out at a pH ranging from 2.0 to 4.0. In the following examples, prior to leaching, the pH of each kaolin suspension was adjusted to a pH of 3.0 by admixing an appropriate amount of a 10% aqueous solution of sulfuric acid therewith. The kaolin suspensions were then subjected to leaching at a pH of 3.0 by admixing therewith sodium hydrosulfite at a rate of four pounds per ton of clay. After leaching the pH level of each suspension was adjusted to 5.0 by admixing therewith a sodium hydroxide solution. The kaolin suspensions were then filtered and rinsed to product a filter cake.

The surface treatment agents used in the following examples were hexamethylenediamine in a 5% aqueous solution and/or aluminum sulfate in a 3% aqueous solution. In all instances, the term "treatment level" with respect to surface treatment refers to the percent on a weight basis of surface treatment agent to dry clay. For example, a treatment level of 0.5% would indicate that the surface treatment agent was mixed into the aqueous clay slurry at a rate of 10 pounds of surface treatment agent per ton of dry clay.

When aluminum sulfate is present in the aqueous clay slurry, precipitation of aluminum hydroxide will begin to precipitate at a pH in excess of 4. In the examples presented herein, the pH of the aqueous clay slurry was adjusted by the addition of sodium hydroxide solution to cause the precipitation of aluminum hydroxide unto the surface of the kaolin. Reference may be made to an article entitled "The Effect of Aluminum On the Surface Properties of Kaolinite", authored by Wayne M. Bundy and Haydn H. Murray of the Georgia Kaolin Co., and published in 1973 in CLAY AND CLAY MINERALS, VOL. 21 at pages 295–302, for a thorough discussion of the process of precipitating aluminum hydroxide onto kaolin particles.

EXAMPLE I

The base kaolin clay composition was blunged in water with sodium hexametaphosphate to form an aqueous kaolin suspension as hereinbefore described. The aqueous kaolin suspension was then subjected to defining at an average level of 45% in an International centrifuge to yield three defined slurries having varying quantities of the ultrafine colloidal particles removed therefrom. Following defining, each kaolin slurry was fractionated thereby yielding three fractionated kaolin suspensions: one fractionated to 0.08 CPS at 10 minutes, one fractionated to 0.10 CPS at 10 minutes, and one fractionated to 0.12 CPS at 10 minutes. The coarse fraction of each of the fractionated kaolin suspensions was then treated with hexamethylenediamine in aqueous solution at a treatment level of 0.08% and with aluminum sulfate in aqueous solution at a treatment level of 0.7% while continuously agitating the suspensions. After treatment, the pH of each kaolin suspension was adjusted to a pH of 3.0 by admixing an appropriate amount of a 10% aqueous solution of sulfuric acid therewith. The kaolin suspensions were then subjected to leaching at a pH of 3.0 by admixing therewith sodium hydrosulfite at a rate of four pounds per ton of clay. After leaching the pH level of each suspension was adjusted to 5.0 by admixing therewith a sodium hydroxide solution. The kaolin suspensions were then filtered and rinsed. The product filter cakes were then redispersed in water using a 70% sodium carbonate/30% sodium polyacrylate dispersant as a dispersing agent. Handsheets were then produced using each product as hereinbefore described at a 10% filler content with the paper filler system consisting in each case of the product kaolin and titanium dioxide at a ratio of 9 parts kaolin to 1 part titanium dioxide on a weight basis. Opacity measurements, taken on handsheets produced from each product kaolin suspensions formed as described in Example 1 are presented in Table I.

TABLE I

| Kaolin | Product CPS 10 Minutes | Opacity at 10% Filler |
| --- | --- | --- |
| Delaminated (90 Brightness) | — | 78.9 |
| Example 1A | 0.08 | 80.4 |
| Example 1B | 0.10 | 80.7 |
| Example 1C | 0.12 | 79.9 |

As can be seen in Table I, there is a relationship between the particle size of the defined product as measured by CPS and opacifying efficiency. Opacity reached a peak at a particle size in the range of 0.08 to 0.10 CPS at 10 minutes. While these product clays, produced by defining and subsequent fractionation, exhibit good opacifying efficiency, the reject fraction is significantly higher than that obtained when the base clay is processed via delamination and defining in accordance with the present invention.

EXAMPLE II

The base kaolin clay composition was blunged in water with sodium hexametaphosphate to form an aqueous kaolin suspension as hereinbefore described. A number of slips of the kaolin suspension were subjected to defining by centrifuging to yield a plurality of defined kaolin suspensions representing defining levels of 13.4%, 42% and 60.2%. Each of these distinct defined kaolin suspensions were then subjected to delamination in a wet media grinder using silica sand as the grinding media to yield a product CPS of 0.08 for each suspension. After screening through a 150 to 200 mesh screen to remove any grinding media, each defined and delaminated kaolin suspension was subdivided into a slip to undergo surface treatment and a slip to remain untreated. The slips to be surface treated were then treated by admixing therewith hexamethylenediamine in aqueous solution at a treatment level of 0.2% and aluminum sulfate in aqueous solution at a treatment level of 0.5% while continuously agitating the admixture. The treated and untreated kaolin suspensions were each then leached, filtered, rinsed, redispersed and used as a paper filler to produce handsheets containing 10% filler clay according to the procedures described in hereinbefore.

TABLE II

| | Defining Level | Treated (?) | Opacity of Paper at 10% Filler |
| --- | --- | --- | --- |
| Example 2A | 13.4 | No | 77.6 |
| Example 2B | 13.4 | Yes | 78.1 |
| Example 2C* | 42.0 | No | 78.0 |
| Example 2D | 42.0 | Yes | 79.3 |
| Example 2E** | 42.0 | No | 78.2 |
| Example 2F** | 42.0 | Yes | 79.5 |
| Example 2G | 60.2 | No | 77.2 |
| Example 2H | 60.2 | Yes | 77.0 |

*Delamination time - 8 minutes
**Delamination time - 3 minutes

As can be seen from Table II, the effectiveness of the surface treatment step on ultimate paper opacity was somewhat dependent on the prior level of defining that the kaolin suspension had been subjected to. At low and high defining levels, i.e., 13.4% and 60.2%, the opacity exhibited by paper handsheets incorporating fillers made from the treated kaolin product differed by +0.5 and −0.2 points, respectively, from the opacity exhibited by paper handsheets incorporating fillers made from the corresponding untreated kaolin products. On the otherhand, at the moderate defining levels of 42% (see Examples 2C, 2D, 2E and 2F), the opacity exhibited by paper handsheets incorporating fillers made from the treated kaolin suspensions exhibited an improvement of 1.3 points over the opacity exhibited by paper handsheets incorporating fillers made from similarly defined but untreated kaolin suspensions.

EXAMPLE III

The base kaolin clay composition was blunged in water with sodium hexametaphosphate to form an aqueous kaolin suspension as hereinbefore described. A first slip of the kaolin suspension was first subjected to defining by centrifuging to yield a defined suspension at a defining level of 42% and then subjected to delaminating followed by fractionation to a product CPS of 0.08 at 10 minutes. A second slip of the kaolin suspension was first subjected to defining by centrifuging to yield a defined suspension at a defining level of 42% and then subjected to delaminating followed by fractionation to a product CPS of 0.04 at 10 minutes. A third slip of the kaolin suspension was not defined, but merely subjected to delamination followed by fractionation to a product CPS of 0.04 at 10 minutes. A first portion of each of the product kaolin suspensions was then further treated by admixing therewith hexamethylenediamine in aqueous solution at a treatment level of 0.2% and aluminum sulfate in aqueous solution at a treatment level of 0.5%. A second portion of each of the product kaolin suspensions was not further treated. The treated and untreated kaolin suspensions were each then leached, filtered, rinsed, redispersed and used as a paper filler to produce handsheets with 10% filler clay according to the procedures discussed hereinbefore.

TABLE III

| Kaolin | Defined | Delaminated | Product CPS* | Surface Treated | Opacity of Paper |
| --- | --- | --- | --- | --- | --- |
| Delaminated (90 brightness) | — | — | — | — | 76.9 |
| Example 3A | X | X | 0.04 | — | 78.0 |
| Example 3B | X | X | 0.04 | Yes | 78.2 |
| Example 3C | X | X | 0.08 | — | 78.0 |
| Example 3D | X | X | 0.08 | Yes | 78.8 |

TABLE III-continued

| Kaolin | Defined | Delaminated | Product CPS* | Surface Treated | Opacity of Paper |
|---|---|---|---|---|---|
| Example 3E | — | X | 0.04 | — | 77.1 |
| Example 3F | — | X | 0.04 | Yes | 77.4 |

*Before Treatment

As can be seen from Table III, the best opacity was exhibited by Example 3D for a handsheet made with a paper filler incorporating a kaolin suspension produced by defining, delaminating and surface treating in accordance with the present invention. The opacity exhibited by the handsheet of Example 3D was nearly two points higher than the opacity exhibited by a handsheet made using a paper filler incorporating the base kaolin clay.

Additionally, a comparison of the opacity measurements of Examples 3A and 3B to those of Examples 3E and 3F, respectively, illustrates the positive effect of defining. It is believed that the generation of colloidal fines in the delamination process of the base kaolin suspension that was not defined results in the lower opacity measurements exhibited by handsheets made using a paper filler produced from the undefined, delaminated kaolin whether or not it is subsequently surface treated.

EXAMPLE IV

The base kaolin clay composition was blunged in water with sodium hexametaphosphate to form an aqueous suspension as hereinbefore described. This suspension was then subjected to delamination in a wet media grinder using silica sand as the grinding media for twelve minutes and fractionated to yield a product CPS of 0.06 at ten minutes. This delaminated suspension was then subjected to defining by centrifuging to yield a plurality of defined kaolin suspensions representing defining levels of 9.7%, 17.5%, 25.5%, 35.8% and 49.4%. After screening, each delaminated and defined suspension was treated with a hexamethylenediamine in aqueous solution at a treatment level of 0.1% and aluminum sulfate in aqueous solution at a treatment level of 0.5%. After leaching, filtering, rinsing and redispersement as hereinbefore described, each of the product kaolins was used as a paper filler, with and without the addition of 10% titanium dioxide, to produce handsheets as described in Example I. For comparison purposes, a handsheet was also produced using commercially available calcined clay, with and without the addition of 10% titanium dioxide, as the paper filler.

TABLE IV

| Kaolin | Defining Level | Opacity of Paper 100% Clay | 90% Clay/10% TiO2 |
|---|---|---|---|
| Calcined | — | 82.3 | 83.0 |
| Example 4A | 9.7% | 78.2 | 80.9 |
| Example 4B | 17.5 | 78.7 | 81.1 |
| Example 4C | 25.5 | 78.5 | 81.2 |
| Example 4D | 35.8 | 79.2 | 81.4 |
| Example 4E | 49.4 | 78.6 | 81.2 |

The effectiveness as paper fillers of kaolin clay treated by a combination of definement, delamination and surface treatment is illustrated by these Examples as shown in Table IV. As noted, the products were defined after delamination. The data suggest optimum definement level at approximately 35%. Of greatest significance is the opacity difference between the systems with and without titanium dioxide. With calcined clay it was 0.7 points, in comparison to 2.2 to 2.6 points for the fillers of this invention. Accordingly, the product of this invention extends titanium dioxide to a much greater degree than calcined clay.

EXAMPLE V

The base kaolin clay composition was blunged in water with sodium hexametaphospate to form an aqueous suspension as hereinbefore described. The aqueous kaolin suspension was then defined by centrifugation with 46.2% of the fine fraction being discarded. The remaining fine and coarse fraction were admixed and then delaminated for three minutes by wet grinding and fractionated to a product CPS of 0.08 at ten minutes. Two slips of the defined and delaminated kaolin suspension were then treated with aluminum sulfate, one slip with hexamethylenediamine, and three slips with both aluminum sulfate and hexamethylenediamine as indicated in Table V below. After leaching, filtering, rinsing and redispersing as hereinbefore described, each of the product kaolins was used as a paper filler with 10% titanium dioxide to produce handsheets as described hereinbefore.

EXAMPLE VI

The base kaolin clay composition was blunged in water with sodium hexametaphosphate to form an aqueous suspension as hereinbefore described. The aqueous kaolin suspension was then defined by centrifugation with 35% of the fine fraction being discarded. The remaining fine and coarse fraction were admixed and then delaminated for three minutes by wet grinding and fractionated to a product CPS of 0.08 at ten minutes. A number of slips of the defined and delaminated kaolin suspension were then treated with aluminum sulfate at treatment levels ranging from 0.3% to 1.0% by weight of dry clay and with hexamethylenediamine at treatment levels ranging from 0.06% to 0.20% by weight of dry clay as indicated in Table V below. After leaching, filtering, rinsing and redispersing as hereinbefore described, each of the product kaolins was used as a paper filler with 10% titanium dioxide to produce handsheets as described in Example I.

TABLE V

| Kaolin | Defining Level | Treatment Al2(SO4)3 | Hexamethylenediamine | Opacity Improvement 90% Paper Clay/10% TiO2 |
|---|---|---|---|---|
| Example 5A | 46.2% | 0.5% | — | +1.0 |
| Example 5B | 46.2 | 1.0 | 0 | +1.3 |
| Example 5C | 46.2 | 0.5 | 0.05% | +1.8 |
| Example 5D | 46.2 | 0.5 | 0.10 | +1.6 |
| Example 5E | 46.2 | 0.5 | 0.20 | +1.8 |
| Example 5F | 46.2 | — | 0.1 | +1.2 |
| Example 6A | 35.0 | 0.5 | 0.06 | +1.0 |
| Example 6B | 35.0 | 0.5 | 0.08 | +0.8 |
| Example 6C | 35.0 | 0.8 | 0.08 | +0.9 |
| Example 6D | 35.0 | 1.0 | 0.08 | +0.9 |
| Example 6E | 35.0 | 0.3 | 0.09 | +1.2 |
| Example 6F | 35.0 | 0.7 | 0.11 | +1.3 |
| Example 6G | 35.0 | 0.3 | 0.12 | +0.9 |
| Example 6H | 35.0 | 0.7 | 0.12 | +1.3 |

The effectiveness of surface treatment using either hexamethylenediamine or aluminum sulfate, taken alone or in combination, in improving opacifying efficiency of paper incorporating kaolin clay fillers so treated is illustrated in Table V. The opacity improvements presented in Table V with respect to Examples 5A–5F are comparisons relative to paper incorporating a filler made from untreated kaolin defined at the 46.2 level, and with respect to Examples 6A-6F, are comparisons relative to paper incorporating a filler made from a 90 brightness, delaminated commercial kaolin. As shown therein, the opacifying efficiency was most favorably increased by treating the defined and delaminated kaolin with both hexamethylenediamine and aluminum sulfate.

A comparison of the opacity measurements of the Examples shown in Table V indicates that a significant improvement in opacifying efficiency of paper incorporating surface treated kaolin clay fillers is achieved by surface treatment after definement and delamination over a wide range of percentages at treatment levels of aluminum sulfate as low as 0.3% by weight and with hexamethylenediamine as low as 0.05% by weight. The most improvement was exhibited when the kaolin was defined to a level of about 45%, delaminated, and then surface treated with both aluminum sulfate at a treatment level ranging from 0.5 to 2.0% by weight and also hexamethylenediamine at a treatment level ranging from 0.05 to 0.20% by weight.

EXAMPLE VII

The base kaolin clay composition was blunged in water with sodium hexametaphosphate to form an aqueous kaolin suspension at 70% solids by weight. A first portion of the high solids kaolin suspension was then diluted with water to 30% solids by weight. This suspension had a CPS of 0.08 at ten minutes. This suspension was then defined to a defining level of 42.7% by twice subjecting the suspension to centrifugation, first for five minutes and then for seventeen minutes. The defined suspension was next delaminated by wet grinding for three minutes and then divided into two fractions. One fraction was then treated with 0.1% hexamethylenediamine and 0.5% of a 3% aluminum sulfate solution and subsequently leached at a pH of 3.0 and filtered. The other fraction was not further treated, but simply leached at a pH of 3.0 and filtered. A second portion of the high solids kaolin suspension was diluted with water to 25% solids by weight. This suspension was then delaminated for eight minutes and then defined to a defining level of 40.6% by twice subjecting the suspension to centrifugation, first for five minutes and then for seventeen minutes. After defining, the defined and delaminated suspension was then divided into two fractions. One fraction was then treated with hexamethylenediamine in aqueous solution at a treatment level of 0.1% and with aluminum sulfate in aqueous solution at a treatment level of 0.5% and subsequently leached and filtered. The other fraction was not further treated, but simply leached and filtered. After rinsing and redispersing, each of the four fractions of product kaolin was used as a paper filler both alone and with 10% titanium dioxide to produce handsheets as described hereinbefore.

TABLE VI

| Kaolin | Processing Order | Treated | 100% Clay | 90% Clay/ 10% TiO$_2$ |
|---|---|---|---|---|
| Commercial Filler | — | No | 77.5 | 80.1 |
| Commercial Filler | — | Yes | — | 80.4 |
| Example 7A | Defined/ Delaminated | No | 78.1 | 80.5 |
| Example 7B | Defined/ Delaminated | Yes | 79.1 | 80.5 |

TABLE VI-continued

| Kaolin | Processing Order | Treated | 100% Clay | 90% Clay/ 10% TiO$_2$ |
|---|---|---|---|---|
| Example 7C | Delaminated/ Defined | No | 77.9 | 80.8 |
| Example 7D | Delaminated/ Defined | Yes | 78.9 | 81.1 |
| Base | — | No | 77.6 | 79.4 |
| Base | — | Yes | 77.7 | 78.8 |

As seen from Table VI, the undefined and undelaminated base kaolin clay, whether treated or untreated, did not perform any better than a presently commercially available kaolin filler, ASTRA-FIL 90. However, when subjected to both definement and delamination in accordance with the present invention, the base kaolin, particularly when delaminated prior to definement and then surface treated, out performed the commercially available kaolin as a paper filler whether used alone or in conjunction with titanium dioxide.

EXAMPLE VIII

The base kaolin clay composition was blunged in an aqueous solution of sodium hexametaphosphate to form an aqueous suspension which was then delaminated, defined and surface treated as indicated below in Table VII with hexamethylenediamine and aluminum sulfate. After leaching, filtering, rinsing and redispersement, each of the product kaolins was used as a paper filler to produce handsheets as described hereinbefore. Handsheets produced with filler derived from the treated kaolins, from untreated kaolins, from commercially available delaminated clays, and from commercially available calcined clays, were tested for strength characteristics with Scott Bond test and Mullen Burst test or tensile strength measurements taken and reported as percentage of unfilled paper strength at loading levels of 10% filler in the handsheets.

TABLE VII

| Kaolin | Defining Level | Hexamethylenediamine Aluminum Sulfate | Scott Bond | Mullen Burst | Tensile Strength |
|---|---|---|---|---|---|
| Example 8A | 32% | None | 68% | 63% | — |
| Example 8B | 32% | 0.08%/0.5% | 68% | 65% | — |
| Example 8C | 43% | None | 66% | 69% | — |
| Example 8D | 43% | 0.08%/0.5% | 71% | 69% | — |
| Example 8E | 23% | None | 62% | — | 71% |
| Example 8F | 23% | 0.10%/0.5% | 74% | — | 74% |
| Example 8G | 38% | None | 69% | — | 68% |
| Example 8H | 38% | 0.10%/0.5% | 74% | — | 68% |
| Calcined Kaolin | — | — | 53% | — | 55% |
| Base Kaolin | — | — | 63% | 63% | — |

The results reported in Table VII testify to the positive influence that the aggregation of collodial kaolin particles by the process of the present invention has upon the physical strength of paper incorporating fillers comprising kaolin clay treated in accordance with the present invention. The higher bonding strength of paper produced using the treated filler clay means that higher filler loading can be achieved with the treated filler clays of the present invention than with commercially available kaolin fillers. Since kaolin is less costly than most pulp, the ability to use higher levels of kaolin filler has definite economic significance to the papermaker.

Additionally, the kaolin fillers produced in accordance with the present invention when compared to commercially available kaolin filler also show better retention characteristics in groundwood formulations. For example, a groundwood formulation incorporating a filler produced from a No. 1 coating clay which was defined, delaminated, and treated with hexamethylenediamine at 0.08% and with aluminum sulfate at 0.7%, exhibited a single pass retention of 64%, while a similar groundwood formulation incorporating a filler produced from ASTRA-FIL 90 exhibited a single pass retention of only 49%. Therefore, the amount of retention aid the papermaker must add to the pulp during the paper making process may be reduced. The kaolin fillers produced in accordance with the present invention also show eight to ten times less abrasiveness than the typical calcined kaolin fillers presently used in groundwood formulations.

EXAMPLE IX

The base kaolin clay composition was blunged in water with sodium hexametaphosphate to form an aqueous kaolin suspension. After delaminating on a wet grinder, the suspension was defined to a level of 43% in a pilot plant scale centrifuge and then surface treated with aluminum sulfate in aqueous suspension at a treatment level of 0.7% and with hexamethylenediamine in aqueous suspension at a treatment level of 0.08%. The delaminated and defined kaolin had a particle size distribution of 91.4% by weight less than two microns and a colloidal content of 14% by weight of the particles less than 0.3 microns. After leaching, filtering, rinsing and redispersement as hereinbefore described, the product kaolin of the present invention was substituted for the clay filler in a typical commercial paper filler formulation, containing 70% ASTRA-FIL 90, a delaminated kaolin clay marketed by Georgia Kaolin Company, Inc. as a paper filler, 20% calcined clay and 10% titanium dioxide. The resultant filler was used to produce handsheets as hereinbefore described for comparison with handsheets produced from the same commercial formulation using a commercially available filler clay. Additionally, handsheets were produced using fillers comprising the kaolin product of the present invention prepared in accordance with this Example with commercially available calcined kaolin or commercially available titanium dioxide.

TABLE VIII

| Filler Composition | | | | Paper Properties | |
| --- | --- | --- | --- | --- | --- |
| ASTRA-FIL 90 | product kaolin | calcined clay | titania | Opacity | Brightness |
| | (% by weight) | | | at 10% filler | |
| 70 | 0 | 20 | 10 | 80.7 | 86.7 |
| 0 | 70 | 20 | 10 | 82.6 | 86.6 |
| 0 | 80 | 10 | 10 | 81.9 | 86.4 |
| 0 | 80 | 20 | 0 | 80.8 | 85.7 |
| 0 | 90 | 0 | 10 | 80.8 | 86.0 |

As can be seen in Table VIII, when the product kaolin of the present invention is used as the filler clay in commercial paper filler formulations, greater amounts of the kaolin filler of the present invention may be used relative to calcined clay and/or titanium dioxide while still maintaining paper opacity and only slightly reducing paper brightness. Accordingly, the use of the product kaolin produced in accordance with the present invention as a paper filler will reduce manufacturing cost by reducing calcined clay and titanium dioxide requirements.

While certain preferred practices and embodiments of the present invention have been set out and illustrated in the examples given herein, it will be understood that this invention may be otherwise practiced within the scope of the appended claims.

We claim:

1. A method for producing a high bulking uncalcined kaolin pigment exhibiting improved opacifying properties when incorporated as a filler in paper, said method comprising:
   a. selecting a base kaolin clay to be processed, the selected base kaolin clay being a hydrated kaolin clay having a brightness of at least about 89;
   b. dispersing the selected base kaolin clay in an aqueous suspension of a water soluble dispersing agent to form an aqueous clay slurry;
   c. delaminating the selected base kaolin clay in said aqueous clay slurry;
   d. removing a portion of the colloidal fines in said aqueous clay slurry by partially defining the delaminated kaolin clay in said aqueous clay slurry by separating the aqueous clay slurry into a first fraction and a second fraction, the second fraction having an average particle size finer than the first fraction, and discarding a first portion of the second fraction and admixing the remaining portion of the second fraction with the first fraction, said first portion of the second fraction comprising from about 25% to about 50% by weight of the second fraction of said aqueous clay slurry;
   e. after said delamination and defining steps, surface treating the kaolin clay particles by admixing into said aqueous clay slurry a member from the group consisting of a water soluble amine, aluminum sulfate, and mixtures thereof while agitating said aqueous clay slurry;
   f. after sufficient agitation, adjusting the pH of said aqueous clay slurry to about 3.0;
   g. treating said aqueous clay slurry at a pH of 3.0 with a water soluble leaching agent;
   h. adjusting the pH of said aqueous clay slurry after leaching to about 5.0; and
   i. collecting the delaminated, defined and treated kaolin clay from said aqueous clay slurry as a product filter cake having a colloidal fines content less than about 20% by weight.

2. A method as recited in claim 1 further comprising redispersing the product filter cake in an aqueous solution of a water redispersing agent at a pH of about 8.0.

3. A method as recited in claim 1 wherein said delaminating step is effected by subjecting said aqueous clay slurry to wet media grinding to a CPS at 10 minutes less than about 0.10.

4. A method as recited in claim 3 wherein said delaminating step is effected by subjecting said aqueous clay slurry to wet media grinding to a CPS at 10 minutes ranging from about 0.06 to about 0.08.

5. A method as recited in claim 1 wherein said aqueous clay slurry is maintained at a solids content of about 25% to about 30% solids by weight during said delaminating step.

6. A method as recited in claim 1 wherein said defining step is effected by centrifuging said aqueous clay slurry.

7. A method as recited in claim 1 wherein said surface treating comprises:
   a. first mixing into said aqueous clay slurry an aqueous solution of a water soluble amine;

b. thence mixing into said aqueous clay/amine slurry, an aqueous solution of aluminum sulfate; and c. agitating said aqueous clay, amine and aluminum sulfate admixture sufficiently to insure an even precipitation of aluminum hydroxide on the kaolin clay particles in said aqueous clay slurry upon adjustment of the pH of the admixture to about 5.0.

8. A method as recited in claim 7 wherein said aqueous solution of a water soluble amine comprises a solution of hexamethylenediamine in water and said hexamethylenediamine is mixed into said aqueous clay slurry at a treatment level ranging from about 0.05% to 0.20% by weight of dry clay.

9. A method as recited in claim 7 wherein said aqueous solution of aluminum sulfate is mixed into said aqueous slurry at a treatment level of 0.3% to 1.0% by weight of dry clay.

10. A high bulking uncalcined kaolin product consisting essentially of a filter cake produced in accordance with claim 1 and dispersed in water, said product having a particle size distribution characterized in that less than about 15% by weight of the kaolin particles have a particle size less than 0.3 microns in equivalent spherical diameter.

11. A method for producing a high bulking uncalcined kaolin pigment exhibiting improved opacifying properties when incorporated as a filler in paper, said method comprising:

a. selecting a base kaolin clay to be processed, the selected base kaolin clay being a hydrated kaolin clay having a brightness of at least about 89;

b. dispersing the selected base kaolin clay in an aqueous suspension of a water soluble dispensing agent to form an aqueous clay slurry;

c. removing a portion of the colloidal fines in said aqueous clay slurry by partially defining the delaminated kaolin clay in said aqueous clay slurry by separating the aqueous clay slurry into a first fraction and a second fraction, the second fraction having an average particle size finer than the first fraction, and discarding a first portion of the second fraction and admixing the remaining portion of the second fraction with the first fraction, said first portion of the second fraction comprising from about 25% to about 50% by weight of the second fraction of said aqueous clay slurry;

d. delaminating the defined base kaolin in clay in said aqueous clay slurry;

e. after said delamination and defining steps, surface treating the kaolin clay particles by admixing into said aqueous clay slurry a member from the group consisting of a water soluble amine, aluminum sulfate, and mixtures thereof while agitating said aqueous clay slurry;

f. after sufficient agitation, adjusting the pH of said aqueous clay slurry to about 3.0;

g. treating said aqueous clay slurry at a pH of 3.0 with a water soluble leaching agent;

h. adjusting the pH of said aqueous clay slurry after leaching to about 5.0; and i. collecting the delaminated, defined and treated kaolin clay from said aqueous clay slurry as a product filter cake having a collidal fines content less than about 20% by weight.

12. A method as recited in claim 11 further comprising redispersing the product filter cake in an aqueous solution of a water soluble redispersing agent at a pH of about 8.0.

13. A method as recited in claim 12 wherein said delaminating step is effected by subjecting said aqueous clay slurry to wet media grinding to a CPS at 10 minutes less than about 0.10.

14. A method as recited in claim 13 wherein said delaminating step is effected by subjecting said aqueous clay slurry to wet media grinding to a CPS at 10 minutes ranging from about 0.06 to about 0.08.

15. A method as recited in claim 11 wherein said aqueous clay slurry is maintained at a solids content of about 25% to about 30% solids by weight during said delaminating step.

16. A method as recited in claim 11 wherein said defining step is effected by centrifuging said aqueous clay slurry.

17. A method as recited in claim 11 wherein said surface treating comprises:

a. first mixing into said aqueous clay slurry an aqueous solution of a water soluble amine;

b. thence mixing into said aqueous clay/amine slurry, an aqueous solution of aluminum sulfate; and c. agitating said aqueous clay, amine and aluminum sulfate admixture sufficiently to insure an even precipitation of aluminum sulfate on the kaolin clay particles in said aqueous clay slurry upon adjustment of the pH of the admixture to about 5.0.

18. A method as recited in claim 17 wherein said aqueous solution of a water soluble amine comprises a solution of hexamethylenediamine in water and said hexamethylenediamine is mixed into said aqueous clay slurry at a treatment level ranging from about 0.05% to 0.20% by weight of dry clay.

19. A method as recited in claim 17 wherein said aqueous solution of aluminum sulfate is mixed into said aqueous slurry at a treatment level of 0.3% to 1.0% by weight of dry clay.

20. A high bulking uncalcined kaolin product consisting essentially of a filter cake produced in accordance with claim 11 and dispersed in water, said product having a particle size distribution characterized in that less than about 15% by weight of the kaolin particles have a particle size less than 0.3 microns in equivalent spherical diameter.

* * * * *